May 10, 1949.  B. O. CHRISTENSON  2,469,496
CONDITION CONTROL SYSTEM
Filed Aug. 30, 1944
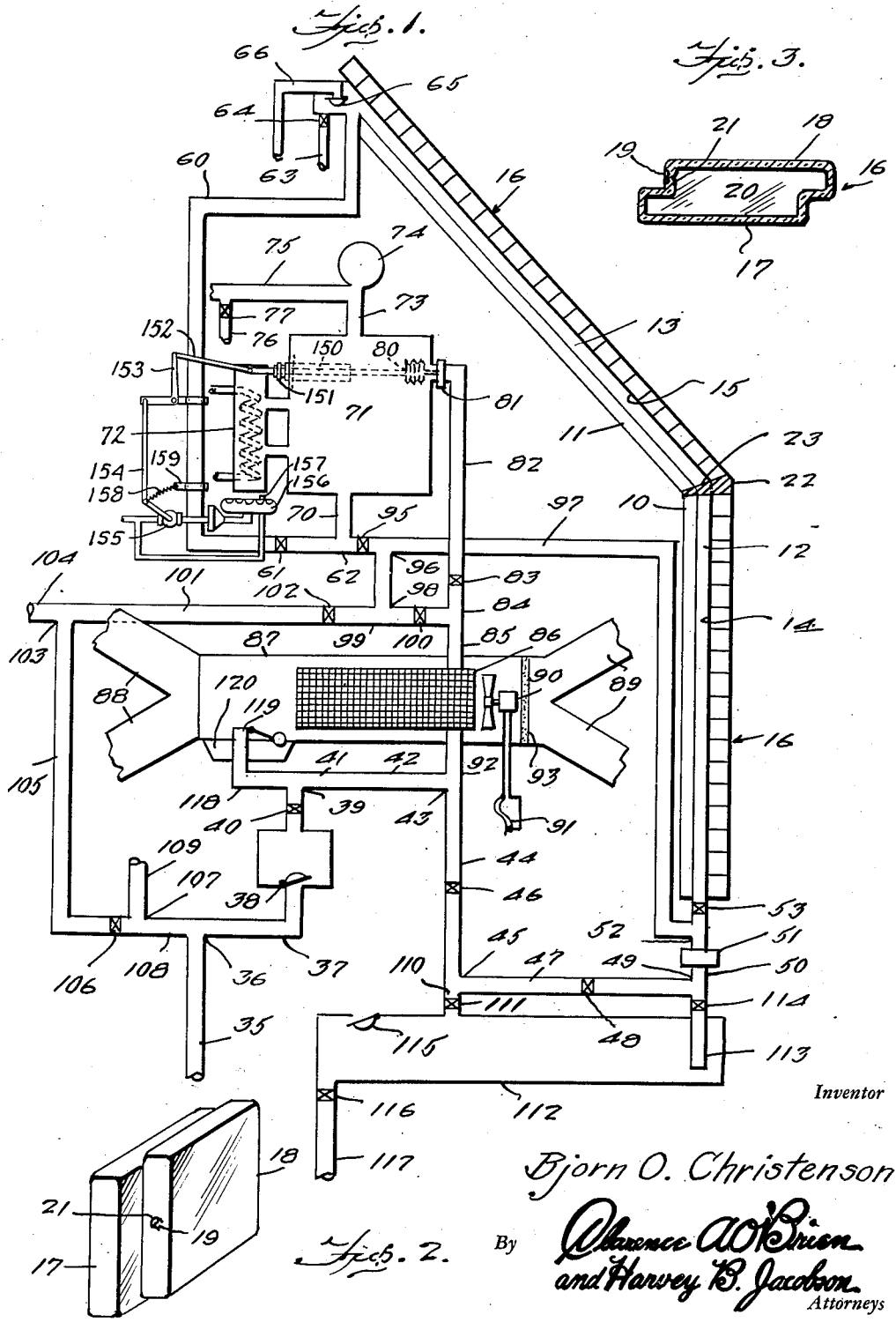
Inventor
Bjorn O. Christenson
By Clarence A. O'Brien
and Harvey B. Jacobson
Attorneys Patented May 10, 1949

2,469,496

UNITED STATES PATENT OFFICE 2,469,496

CONDITION CONTROL SYSTEM

Bjorn O. Christenson, De Pere, Wis.

Application August 30, 1944, Serial No. 551,962

2 Claims. (Cl. 237—1)

This invention relates to a condition control system and more particularly to such a system adapted to control the temperatures of air and water for domestic or industrial use or the like.

A primary object of this invention is the provision of such a system whereby the condition control is accomplished by solar radiation.

An additional object is the provision of means whereby such solar radition may be utilized without concentrating the same by the use of mirrors, reflectors, lenses, or similar intensifying devices.

A still further object is the provision of means in such a system for applying such solar radiation to the heating of a building, and the air therein or the like.

A still further object is the provision of means in such a system for utilizing solar radiation to heat the water for domestic or industrial use.

An additional object is the provision of such a system wherein means are provided to readily convert the apparatus to cooling the air in the dwelling or other structure when conditions warrant.

A more specific object is the provision of means of improved structural design for effecting the utilization of solar radiation to achieve the above mentioned objects.

Other objects will in part be obvious and in part be pointed out as the description of the invention proceeds, and shown in the accompanying drawings, wherein there is disclosed a preferred embodiment of this invention.

In the drawings:

Figure 1 is a schematic representation of one form of condition control system embodying this inventive concept.

Figure 2 is an enlarged perspective view of one of the elements adapted to be utilized in conjunction with such a system, and Figure 3 is a plan sectional view of the element of Figure 2.

Like reference numerals refer to like parts throughout the several views of the drawings.

As conducive to a clearer understanding of this invention, it may here be pointed out that it is well known that vacuum serves effectively as a heat insulating medium. It is further well known that material having heat conductive characteristics when of a dark color, such as black, serves normally as a conductor for heat therethrough rather than as a repellent for such heat.

It is an object of this invention therefore to apply these known principles, to a new and improved condition control system, in order to utilize effectively the heat occasioned by solar radiation to condition the air or water within a building structure or the like.

Having reference now to the drawings there is, schematically indicated in Figure 1, an embodiment of the system of the instant invention such as might be applicable to a small building, as for example a four-room dwelling.

In Figure 1, 10 indicates, schematically, a side sectional view of a portion of a wall of a house and 11 designates a portion of the roof wall thereof. Suitably affixed to the exterior of walls 10 and 11 are tanks 12 and 13, respectively. Tanks 12 and 13 may be applied to any desired section of the side walls and the roof of a building and cover any desired area, and may be either large unitary structures, in which case suitable spacers (not shown) are provided between the inner and outer walls of the tanks or may be comprised of a large number of relatively small interconnected units.

Tanks 12 and 13 are preferably constructed of metal or similar conductive material and have their outer walls, 14 and 15, respectively, colored both on their inner and outer surfaces a dark color, preferably black.

Positioned outside the exterior surface of tanks 12 and 13 are a relatively large number of transparent hollow blocks 16 of glass, plastic, or other suitable material.

Blocks 16 are comprised as shown in Figures 2 and 3 of two sections 17 and 18, offset from each other in such manner as to preclude the formation of a direct mortar joint passing completely through the surface formed by the blocks. Each block is provided with a recessed aperture 19 through which the block is adapted to be evacuated, the space 20, in the interior thereof, thus forming a vacuum chamber. After each block has been evacuated aperture 19 is sealed as by a sealing tip 21, tip 21 being positioned within the recess 19, in order to preclude the accidental breakage of the same in setting the blocks, and the consequent loss of the vacuum therein.

From the foregoing it will now be seen that water contained within tanks 12 and 13, and introduced therein in a manner to be described hereinafter, is adapted to be warmed or heated, by the passage of the sun's rays through blocks 16 and the subsequent impingement thereof on blackened surfaces 14 and 15. It may here be pointed out that the blocks 16 are adapted to be set in a suitable mortar of an expansible and contractible character to permit relative extension of the sizes of the blocks occasioned by variations in temperature, and that there is a similar expansible and contractible joint 22 positioned between the blocks in adjacent relation on walls 10 and 11 exterior of tanks 12 and 13, the joint 22 extending also between the tanks 12 and 13 and being provided with a communicating pipe 23 therebetween.

Having particular reference now to the system, water is admitted to the same through an inlet pipe 35 connected to any suitable source of supply such as a city water system. Pipe 35 leads to a T 36, one leg 37 of which extends to a suitable one-way valve 38 from which a pipe 39 having a valve 40 therein extends to a T 41. One leg 42 of T 41 extends to a further T 43 from one leg of which latter a pipe 44 extends to a T 45, pipe 44 having a valve 46 therein. One leg of T 45 extends through a pipe 47 having a valve 48 therein to a further T 49 one leg 50 of which has a suitable pump or circulator 51 positioned therein. Pipe 50 leads to a T 52 one leg of which extends through a valve 53 into the lower portion of tank 12. It will thus be seen that when the valves 40, 46, 48 and 53 are in open position, certain other valves to be described hereinafter being closed, water will be fed directly from the source of supply into the heating tanks, being either pumped thereinto by pump 51, or allowed to circulate, after a certain quantity of water in the tank becomes heated, by normal convection current.

From the upper extremity of tank 13 an outlet pipe 60 leads through a valve 61 to a T 62. Adjacent the extremity of tank 13 is also positioned an overflow pipe 63 having a pressure actuated safety valve 64 positioned therein, and above which is positioned a one-way valve 65 communicating with an air pipe 66. Valve 65 is so arranged as to permit the ingress and exit of air into the system as water is drained therefrom, but so designed as to be floated shut when the level in the top portion of pan 13 approaches the mouth of pipe 66.

One leg of T 62, 70, extends into a storage tank 71 provided with an associated water heater 72 of any desired conventional construction, and also having an outlet 73 provided with an air chamber 74 from which an outlet pipe 75 lead to the hot water fixture (not shown) of the building. An overflow pipe 76 provided with a pressure actuated safety valve 77 extends from pipe 75.

Positioned within the tank 71 is a thermostat 80 which when in expanded position engages the adjacent end of the rod 150 which extends through the packing box 151, and whose opposite end is connected by the link 152 to one end of the bell crank lever 153 pivotally supported on the outlet pipe 60. A link 154 is connected between the other arm of the bell crank lever 153 and the gas cut-off valve 155 to turn off the gas burner 156 when said thermostat 80 is in expanded position. The burner 156 is provided with a pilot 157 and a spring 158 is connected between the cut-off valve 155 and an arm 159 on the pipe 60 to again open the valve to cause the burner to again operate when the temperature of the water in the tank 71 drops to a predetermined point. Thermostat 80 is also adapted to actuate a thermostatic valve 81 positioned in a pipe 82, comprising the circulating outlet from the storage tank, when the temperature in tank 71 falls below the level at which the heater is energized.

Pipe 82 extends through a valve 83 to a T 84, one leg of which 85 extends into a radiator 86 of any desired type but preferably of the honeycomb variety.

Radiator 86 is positioned in association with an air duct 87 from which suitable conduits 88 are adapted to conduct heated air to registers or the like. Inlets 89 are also provided to permit circulation of air through the ducts. A blower 90 or the like is positioned within the ducts 87, and controlled by a conventional room thermostat 91 positioned at any desired location, the arrangement being such that when it is desired to heat the house as the temperature falls below a predetermined minimum the fan is energized to draw air through a filter 93 and blow the filtered air over the radiator, heated by water entering the same through pipe 85. After the water has circulated through the radiator it passes therefrom through a pipe 92 which comprises the other leg of T 43.

The other leg of T 62 connects through a valve 95 with a T 96, one end of which extends into a by-pass 97 which communicates with the remaining leg of T 52, between pump 51 and valve 53. The other leg of T 96 communicates with a T 98 one leg of which 99 leads through a valve 100 to the remaining leg of T 84, and the other leg of which 101 leads through a valve 102 to a T 103. One leg of T 103 comprises a connection 104 to the cold water outlet (not shown) of the plumbing system of the household.

The other leg of T 103 extends through a pipe 105 to a valve 106 and a T 107, one leg 108 of which connects through T 36 with the inlet 35 of the system, 109 of which connects with the drinking fixture (not shown) of the dwelling or other structure.

Referring back now to T 45 it will be seen that the remaining leg 110 leads through a valve 111 to a floor tank 112 preferably positioned beneath the floor of the dwelling. A pipe 113 leads through a valve 114 to the remaining leg of T 49. Tank 112 is provided with a one-way valve 115 to permit the ingress and exit of air therefrom, but constructed in a manner similar to valve 65 being adapted to float to closed position when the tank 112 is filled with water. A valve 116 is positioned in an outlet pipe 117, adapted to empty into the city sewage system or any other desired system for the disposal of waste water.

From the foregoing the operation of the system should now be understandable. When it is desired to fill the system the valves 40, 46, 48, and 53 are opened, valves 106, 111 and 114 and 83 being closed, and the pump 51 started, which operation fills the tanks 12 and 13. The pumping is continued, water overflowing tank 13 flowing through pipe 60 to the storage tank 71, valve 61 being open and valve 95 being closed, until such time as the tank is full. The pump may then be shut off until the combined action of solar radiation and the heating element associated with heater 72 function to raise the temperature of the water in the tank to the desired point. When such point is reached thermostatic valve 81 automatically opens, valve 83 is opened and water from the tank flows in to the radiator 86 and therethrough, thence returning through pipe 92 and pipe 47 to pipe 41 to be recirculated, by renewed operation of the pump. It may here be pointed out that one leg of T 41, 118, leads through a float valve 119 to a conventional tank humidifier 120 positioned in the path of air blown over radiator 86 by fan 90. It may also be pointed out that the air dome 74 serves, when the system is full, to preclude the admittance of additional water from supply pipe 35 until such time as water circulating in the system is drawn off from the hot water fixture through pipe 75. As such water is drawn off the pressure in dome 74 is reduced permitting additional water for replacement purposes to be drawn from the cold water supply line 35.

Obviously, when the temperature within the rooms to be heated falls below a predetermined point, the thermostat 91 energizes fan 90 to blow air over the heat exchanger or radiator 86, and humidifier 120 to supply warm humid air as desired through the heating system of the house.

Under certain conditions, as in cold climate at night, it is desirable to drain the water out of the wall and roof pans 13 and 14. For this purpose floor tank 112 is provided, the tank being of a sufficient capacity to permit all the water from the tanks to be drained thereinto. To accomplish this operation the valve 46 is closed and the valves 111 and 114 opened. After the water has all drained from the wall and roof tank valve 46 is reopened, valve 53 is closed, valve 61 is closed and valve 95 is opened.

It will now be seen that during the winter operation of the device the water during the day circulates in the manner above described from the pump 51 through the pans 12 and 13, pipe 60, the storage tank 71, pipe 82 and radiator 86 and thence through pipes 44 and 47 back to the pump 51.

It will also be seen, however, that when the water is drained from the tanks 12 and 13, the circulation is from pump 51, which may or may not be operating in accordance with the temperature of the water and the normal convection current therein through the pipe 97 and the valve 95 through the storage tank 71 and thence back through pipe 82 and the radiator 86 through pipe 44 and connection 110 to floor tank 112 thence back through pipe 113, valve 114 and pipe 59 to pump 51.

Under this latter condition of operation it will be apparent that the heated water in floor tank 112 serves as an additional warming means for the house during the chill of the night, keeping the floor relatively warm, and that any possibility of loss of heat from water in the tanks 13 and 14 is precluded.

It will also be seen that drinking water is provided at all times direct from the normally cool water source through the pipe 35, T 36, leg 108, T 107 and pipe 109. During winter operation valve 106 is normally adapted to be opened, so that water may pass from inlet 35 through pipe 105 direct to the cold water outlet 104.

When it is desired to change the system over for summer cooling operation, the entire system is first drained. This is accomplished by closing valves 40, 106 and 102, and opening all the remaining valves including outlet valve 116. Thus all the water within the system is permitted to drain off while an uninterrupted supply of cold water is permitted to pass from the inlet to the cold water and drinking water outlets. After the drainage has been accomplished valve 116 is closed, as are valves 46, 83, and 95, valves 61 and 100 are opened, and thermostatic valve 81 closed and the thermostat disconnected therefrom. Likewise thermostat 91 is readjusted in such manner that the fan 90 is energized when the temperature rises above a predetermined point and deenergized when the temperature falls below such point. Cold water now enters the system through pipe 35 and passes upwardly through pipe 92 through radiator 86 and thence through pipe 85 and valves 100 and 102 outwardly to cold water outlet 104. When the fan 90 is energized the air blowing over the radiator 86 will give up a certain amount of its heat to the water in the radiator, the water being correspondingly warmed. Thus, cool air will be passed outwardly through the ducts 88 to the room to be cooled and the water being slightly but not materially warmed will be at an adequate temperature for household uses other than drinking. It may here be pointed out that drinking water will still pass from inlet 35 through pipe 109 directly to the drinking water fixture and that such water will retain the relatively cool temperature of the source of supply. A certain amount of the water passing through pipe 99 will be diverted through T's 92 and 96 and pipe 97 to wall and roof tanks 12 and 13 and thence, partially heated, through pipe 60 to storage tank 71. The system under the conditions above mentioned will normally be full except when water is being drained from outlet 104, at which time additional water will enter through inlet 35, and the pressure of such water in the system will tend to retain the water in tanks 71, keeping the same normally full. The thermostat 80 remains connected to the heater 72 and operates in the same manner as when the system is used for winter operation. Accordingly, the water in the tank 71 will be retained at a sufficient heat for the application to normal hot water usages. As normal convection precludes the fall of hot water through cold water the temperature of the water in the lower part of the system will be substantially unaffected by the temperature of the water in storage tank 71 or wall and roof tanks 12 and 13.

From the foregoing it will now be seen that there is herein provided an air and water conditioning system, accomplishing all the objects of this invention and many others including advantages of great practical utility and commercial importance.

It will also be seen that the system may be adapted to various sizes and construction of buildings as desired. Likewise, the various valves disclosed in varying positions throughout the specification may be manually operated directly, or may be suitably operated, in a desired manner from a remotely controlled point, or may be automatically operated by any desired suitable means known to those skilled in the art.

As many embodiments may be made of this inventive concept, and as many modifications may be made in the embodiment hereinbefore described and shown in the accompanying drawings, it is to be understood that all matter herein is to be interpreted merely as illustrative and not in a limiting sense.

I claim:

1. In a heating system for a building having a fluid source, heating tanks for said fluid positioned exteriorly of the building, heat exchange means in contact with said tanks for heating the tanks by solar radiation, pumping means for urging the fluid through said tanks, valved connections between the fluid source and the pumping means, a radiator, a conduit system for circulating heated fluid through said radiator and returning it to the tanks, thermostatically controlled means for passing a current of air over said radiator and means for conveying the heated air through the interior of the building, an auxiliary heating system, means for circulating fluid through the auxiliary system and valves in said conduit system for draining and bypassing the heating tanks whereby said fluid is circulated only through the auxiliary heating system.

2. In a heating system for a building having a fluid source, heating tanks for said fluid positioned exteriorly of the building, heat exchange means in contact with said tanks for heating the tanks by solar radiation, pumping means for urging the fluid through said tanks, valved connections between the fluid source and the pumping means, a radiator, a conduit system for circulating heated fluid through said radiator and returning it to the tanks, thermostatically controlled means for passing a current of air over said radiator and means for conveying the heated air through the interior of the building, an auxiliary heating system, a heater in said system, means for circulating fluid through the auxiliary system and valve connections in said conduit system for draining and bypassing the heating tanks whereby said fluid is circulated only through the auxiliary heating system, and storage means for the fluid drained from the tanks positioned beneath the building and adapted to radiate heat within the house.

BJORN O. CHRISTENSON.

REFERENCES CITED

The following references are of record in the file of this patent:

UNITED STATES PATENTS

| Number | Name | Date |
|---|---|---|
| 1,068,650 | Harrison | July 29, 1913 |
| 1,888,620 | Clark | Nov. 22, 1932 |
| 2,077,750 | Fish | Apr. 20, 1937 |
| 2,111,569 | Mulford | Mar. 22, 1938 |
| 2,125,889 | Crump | Aug. 9, 1938 |
| 2,232,465 | McGregor | Feb. 18, 1941 |
| 2,252,064 | Cornell | Aug. 12, 1941 |
| 2,261,852 | Mathis | Nov. 4, 1941 |
| 2,277,247 | Morse | Mar. 24, 1942 |
| 2,311,579 | Scott | Feb. 16, 1943 |
| 2,342,211 | Newton | Feb. 22, 1944 |

OTHER REFERENCES

Pages 284–286 of Scientific American, June, 1942, published by Munn & Co., Inc., New York, N. Y.